United States Patent [19] [11] Patent Number: 4,988,989
Goto [45] Date of Patent: Jan. 29, 1991

[54] MASTER-SLAVE COMMUNICATION SYSTEM FOR STATIONS HAVING TIMER MEANS

[75] Inventor: Tadaomi Goto, Osaka, Japan

[73] Assignee: Sharp Kabushiki Kaisha, Osaka, Japan

[21] Appl. No.: 261,937

[22] Filed: Oct. 25, 1988

[30] Foreign Application Priority Data

Oct. 26, 1987 [JP] Japan .................. 62-271035

[51] Int. Cl.$^5$ .............................................. H04B 3/00
[52] U.S. Cl. ..................... 340/825.21; 340/825.06; 340/825.14; 370/85.1
[58] Field of Search ........... 340/825.21, 825.2, 825.52, 340/825.05, 825.07, 825.14, 825.53, 825.54; 370/66, 88, 85, 100, 85.1, 85.12, 100.1, 106; 375/110, 111, 114, 100; 358/84; 328/72; 370/85.1, 85.12, 100.1, 106

[56] References Cited

U.S. PATENT DOCUMENTS

| | | | |
|---|---|---|---|
| 4,679,192 | 7/1987 | Vanbrabant | 370/100.1 |
| 4,733,224 | 3/1988 | Kimura | 340/825.07 |
| 4,763,339 | 8/1988 | Sutphin et al. | 375/114 |
| 4,785,449 | 11/1988 | Nakamura et al. | 370/85 |
| 4,815,105 | 3/1989 | Bottoms et al. | 340/825.21 |
| 4,860,001 | 8/1989 | Yamanaka et al. | 340/825.07 |

FOREIGN PATENT DOCUMENTS

| | | | |
|---|---|---|---|
| 183273 | 6/1986 | European Pat. Off. | 340/825.07 |
| 52-54884 | 5/1977 | Japan | 340/825.07 |
| 54-78906 | 12/1977 | Japan . | |
| 55-143698 | 4/1979 | Japan . | |
| 61-6946 | 1/1986 | Japan | 340/825.07 |

Primary Examiner—Donald J. Yusko
Assistant Examiner—Dervis Magistre

[57] ABSTRACT

A main station has a first timer device and each of a plurality of peripheral stations connected to the main station, through a communication line, has a second timer device. Data is transmitted between each of the plurality of peripheral stations and the main station, with every unit period of communication and the order of the communication therebetween being predetermined. In the unit period of communication mentioned above, an initializing data signal is transmitted from the main station to each of the peripheral stations and a data signal is transmitted between the main station and each peripheral station every individual communication period of each of the peripheral stations.

17 Claims, 8 Drawing Sheets

MASTER-SLAVE COMMUNICATION SYSTEM FOR STATIONS HAVING TIMER MEANS

BACKGROUND OF THE INVENTION

1. Field of the Invention

The present invention relates to a communication system which is preferably adopted in a communication between a programable controller of an industrial robot and various kinds of input and output units, for example.

2. Description of the Prior Art

In the prior art, in operating an industrial robot for example, the communication between a programable controller included in the robot and input/output units comprising one or more limit switches and/or solenoid valves was performed by means of communication systems as follows.

(1) POLLING SYSTEM

A communication system was operated in which each of slave station such as an input unit or an output unit having a demand for sending a signal sent a signal in response to an inquiry or polling signal transmitted from a master station, such as a programable controller.

(2) CSMA-CD SYSTEM

A communication system was operated in which each of slave stations was connected to a master station through a line, with the condition of the line being monitored, the slave station sending a signal when the line was out of use. In this CSMA-CD system when one slave station was using the line, the other slave stations having a request to send signal had to wait to send a signal until the line become available. Moreover, when an impingement of signals occurred in the line, such that a plurality of slave stations were set to use the line at the same time, after waiting for a predetermined period, the respective slave stations monitored the condition of the line and the slave station sent a signal when the line was out of use.

(3) TOKEN PASSING SYSTEM

A communication system was operated in which a token was passed on a line. When a slave station receiving a free token had a demand for sending a signal, the slave station changed the token into a busy token so as to thereafter send a packet of data of its own station.

The communication systems as described above have been proposed as a general purpose communication system which is used in a communication with a comparatively large amount of data, for sending the data signals intermittently whenever data transfer is requested. However, in the communication between the programable controller and the input/output units, each of the slave stations for input and output has an amount of data of several bytes, but it is desirable that the communication can be periodically performed in a high speed. According to the above mentioned communication systems in the prior art, the redundancy is so high that the communication system is not suitable to communicate between the programable controller and the input/output units.

SUMMARY OF THE INVENTION

An object of the present invention is to provide a communication system which is suitable for the communication between a plurality of peripheral stations and the main station with comparatively small amount of data capacity, in which the data can be periodically transmitted at a high speed.

A communication system according to the present invention comprises;

a main station including first timer device and a plurality of peripheral stations each of which includes second timer device, being connected to the main station through one or more communication lines so as to perform the transmission of data signals between the main station and each of the peripheral stations every communication unit period, in which the communication order is predetermined, wherein an initializing data signal is transmitted from the main station to each of the peripheral stations in the communication unit period and a data signal is transmitted between the main station and each of the peripheral stations in the individual communication period of each of the peripheral stations. The first and second timer devices are initialized by the transmission of the initializing data, and after the second timer device in each of the peripheral stations finishes the timing of a waiting time, predetermined on the basis of its own communication order and said individual communication period, the data is transmitted between the each peripheral station and the main station. In the main station, the peripheral station which is under transmission of data signals is identified on the basis of the time registered by the first timer device.

In the present invention, the main station comprises a first timer device, and each of a plurality of peripheral stations, connected to the main station through a communication line, comprises a second timer device. A data signal is transmitted between each of the plurality of peripheral stations and the main station every communication unit period and the order of the communications therebetween is predetermined. In the communication unit period mentioned above, an initializing data signal is transmitted from the main station to each of the peripheral stations and a data is then transmitted between the main station and each peripheral station every individual communication period of each of the peripheral stations.

The first and second timer devices are initialized by transmitting the initializing data signal from the main station to each of the peripheral stations. After finishing the timing of the waiting time, determined on the basis of the communication order of the peripheral station and the individual communication period assigned to each of the peripheral stations, a data signal is transmitted between each of the peripheral stations and the main station. In the main station, a peripheral station which is under transmission of data is identified on the basis of the time registered by the first timer device.

Data transmission can be periodically performed by repeating the transmission of data every communication unit period mentioned above, and the individual communication period assigned to each of the peripheral stations can be found by the timing operation of the second timer device in each of the peripheral stations. A peripheral station which is under transmission of data can be identified on the basis of the time registered by the first timer device in the main station, therefore, there can be omitted an operation such as sending an identification signal from the main station to the peripheral station or sending a communication starting signal from the peripheral station to the main station, whereby the data communication can be performed at a higher speed.

DETAILED DESCRIPTION OF THE PREFERRED EMBODIMENT

Figure 1:
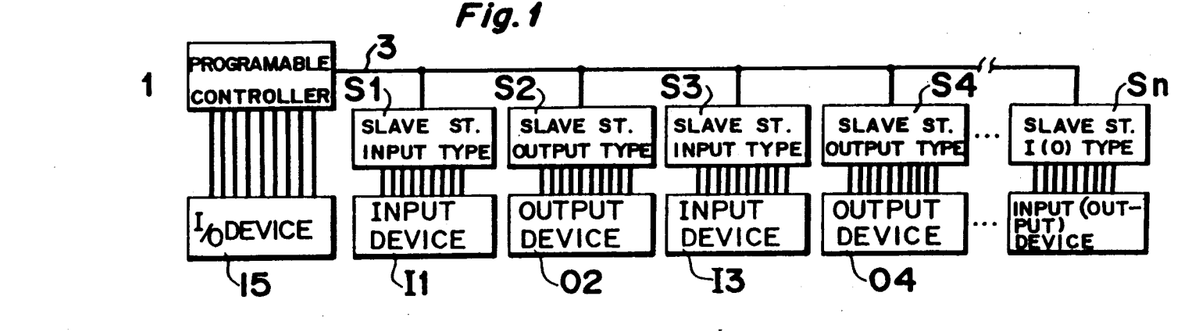
FIG. 1 is a block diagram showing an entire arrangement of an embodiment of a communication system according to the present invention.

In FIG. 1, an input/output (I/O) device 15 is connected to a programable controller 1, i.e., main station, through several lines in order to change an operating condition of the programable controller 1. The programable controller 1 is connected to a plurality of peripheral stations, i.e., slave stations S1 to Sn, through a communication line 3, so that data signals are transmitted between the main station 1 and each of the slave stations S1 to Sn through the communication line 3. In the slave stations S1 to Sn, there are two types of slave stations, input type and output type, wherein each of input devices I1, I3, . . . , such as a limit switch, is connected to each of the input type slave stations S1, S3, . . . and each of output devices 02, 04, . . . , such as a solenoid valve, is connected to each of the output type slave stations S2, S4, . . . The station numbers or addresses 1 to n are respectively assigned to the slave stations S1 to Sn as described hereinafter.

Figure 2:
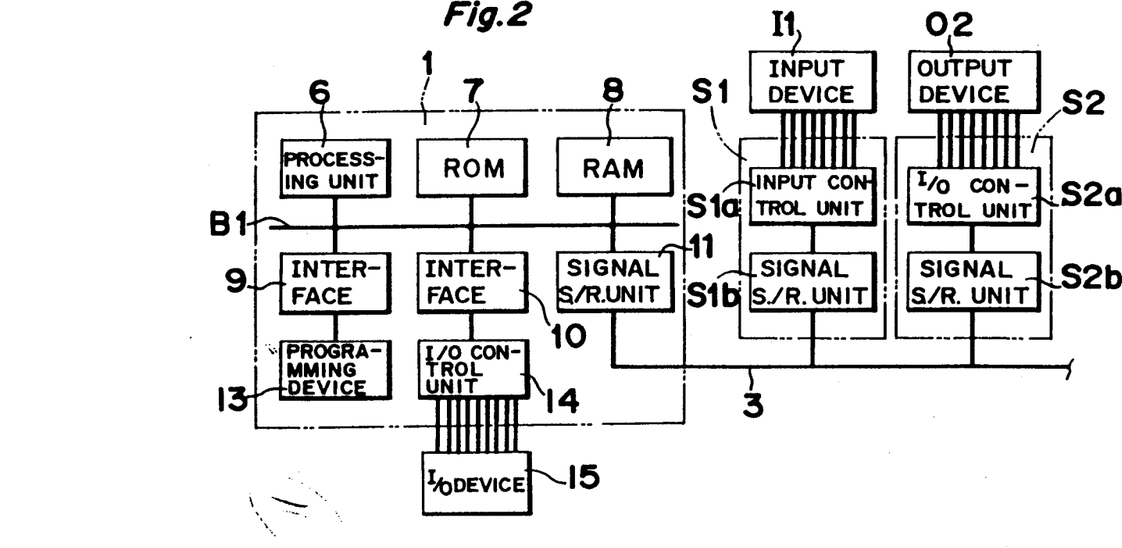
FIG. 2 is a block diagram showing a detailed constitution of a programable controller 1 and slave stations S1 and S2.

As shown in FIG. 2, in the programable controller 1, in order to transmit a data signal between the programable controller 1 and each of the slave stations S1 to Sn through the communication line 3, the signal sending/receiving unit 11 is connected to a bus line B. The bus line B is further connected to a processing unit 6, a read only memory (referred to as ROM hereinafter) 7 storing a sequence control program, a random access memory (referred to as RAM hereinafter) 8, interfaces 9 and 10, and a signal sending/receiving unit 11. A programming device 13 is connected to the bus line B1 through the interface 9, and an input/output device 15, such as a keyboard, is connected to the bus line B1 through the interface 10 and through an input/output control unit 14. The processing unit 6 performs transmission of data signals between the programable controller 1 and each of the slave stations S1 to Sn through the signal sending/receiving unit 11 and the communication line 3 on the basis of the sequence control programs stored in the ROM 7 and RAM 8. The processing unit 6 acts to receive the data signal transmitted from the input devices I1, I3, . . . and to control the operations of the output devices 02, 04, . . .

The slave station S1 comprises input/output (I/O) control unit S1a and signal sending/receiving unit S1b. Input devices I1 is connected to the input/output (I/O) control unit S1a, which is connected to the signal sending/receiving unit S1b and connected to the communication line 3. Similarly, the output device O2 is connected to the input/output (I/O) control unit S2a which is connected to the communication line 3 through the signal sending/receiving unit S2b. A similar structure is employed in the slave stations S3 to Sn and the slave station Sk ($1 \leq k \leq n$) comprises the input/output control unit Ska and sending/receiving unit Skb connected in a similar manner as previously described with regard to the units S1a and S1b.

Figure 3:
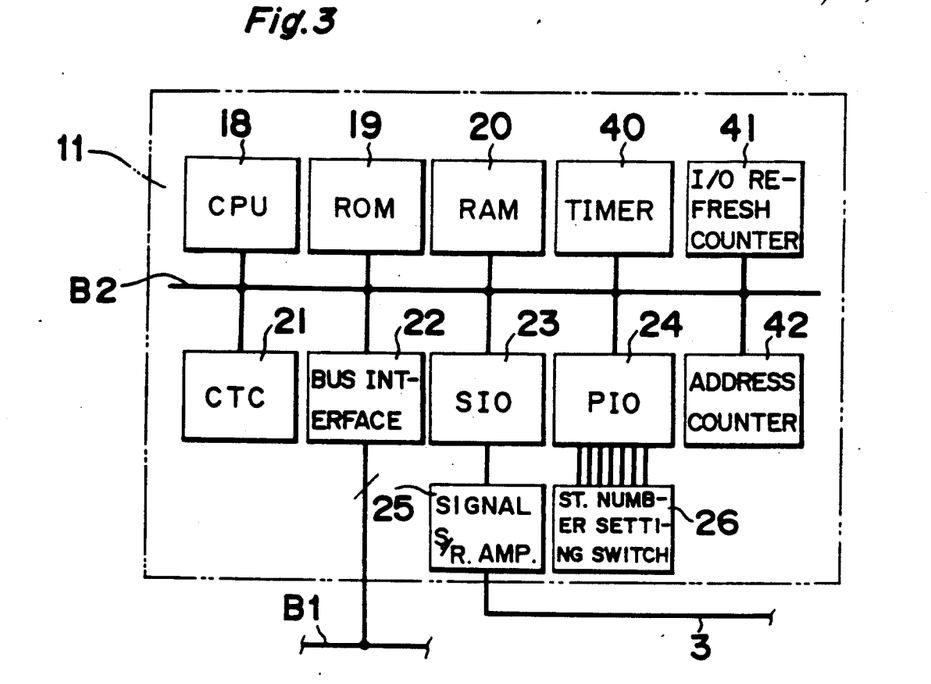
FIG. 3 is a block diagram showing a detailed constitution of a signal sending/receiving unit 11.

FIG. 3 is a block diagram showing a fundamental constitution of the signal sending/receiving unit 11 in which there are provided a CPU (Central Processing Unit) 18, ROM 19, RAM 20, counter timer controller (referred to as CTC hereinafter) 21, bus interface 22, serial I/O interface (referred to as SIO hereinafter) 23, parallel I/O interface (referred to as PIO hereinafter) 24, signal sending/receiving amplifier, station number setting switch 26, time slot control timer (referred to as TIMER hereinafter) 40, input/output (I/O) refresh counter 41 and address counter 42. The CPU 18 is provided in order to reduce the load of the Processing Unit 6 for performing the sequence control provided in the programable controller 1. The CPU 18 performs transmission of data signals among each of the units, through a bus line B2. The ROM 19 and RAM 20 are connected to the bus line B2 so that the CPU 18 is operated on the basis of the program stored in the ROM 19, using the RAM 20 as a working area.

The communication line 3 is connected to the bus line B2 through the signal sending/receiving amplifier 25 and through the SIO 23. The bus line B2 is connected to the bus line B1 through the bus interface 22. The station number setting switch 26 is provided in order to set the number n, of the slave stations, the switch 26 being connected to the bus line B2 through the PIO 24. Furthermore, the TIMER 40 which is a first timer device as to be described later, I/O refresh counter 41, and the address counter 42 for renewing the station number (address) of the slave stations for performing the data communication, are connected to the bus line B2 so as to be controlled by the CTC 21, which is also connected to the bus line B2.

Figure 4:
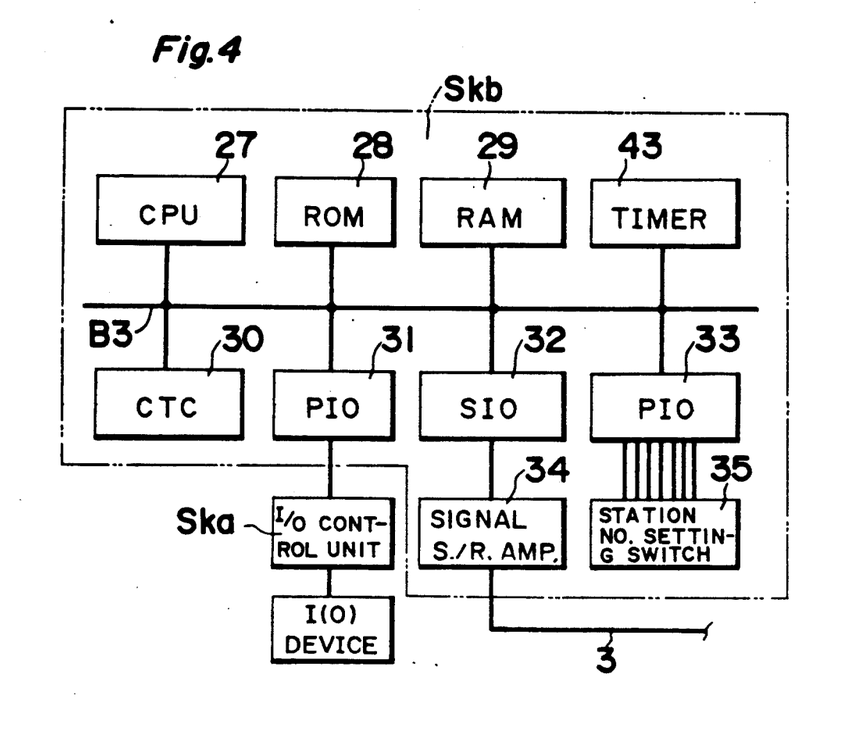
FIG. 4 is a block diagram showing a detailed constitution of a signal sending/receiving unit Skb in a slave station Sk.

FIG. 4 is a block diagram showing a detailed constitution of the signal sending/receiving unit Skb provided in the slave station Sk. The signal sending/receiving unit Skb comprises a CPU 27, ROM 28, RAM 29, TIMER 43, CTC 30, PIO 31, SIO 32, PIO 33, signal sending/receiving amplifier 34 and station number setting switch 35. The above mentioned units 27 to 33 and 43 are connected to a bus line B3. The bus line B3 is connected to the communication line 3 through the SIO 32 and through the signal sending/receiving amplifier 34, and furthermore connected to the input(output) device I(O)k through the PIO 31 and through the I/O control unit Ska provided in the slave station Sk. The station number, that is address k, of the signal sending/receiving unit Skb, is set by the station number setting switch 35 which is connected to the bus line B3 through the PIO 33. The operation of the TIMER 43 which is a second timer device to be described later, is controlled by the CTC 30.

Figure 5:
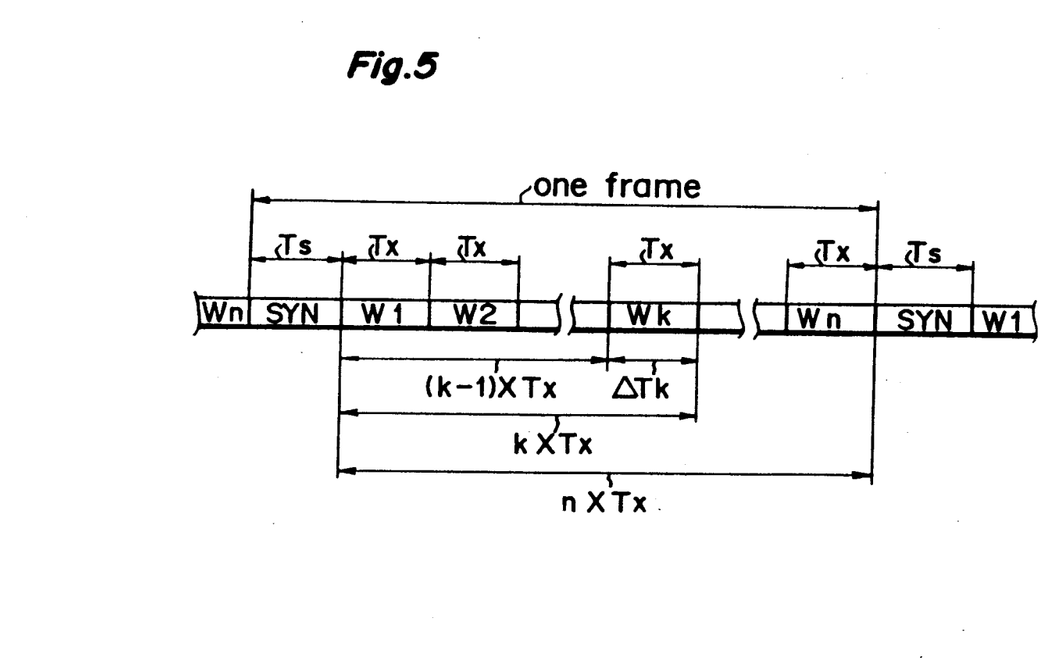
FIG. 5 is a schematic diagram for explaining a constitution of one frame corresponding to one communication unit period.

FIG. 5 is a schematic diagram for explaining the constitution of one frame which is one unit communication period of the data transmission performed in the present embodiment. Each of the frames consists of a synchronizing word SYN as a head word and data words W1 to Wn, wherein the synchronizing word SYN is initialization information transmitted from the signal sending/receiving unit 11 to all of the slave stations S1 to Sn, and W1 to Wn are the data words determined by the number n of the slave stations connected to the programable controller 1. Each of the data words W1 to Wn is assigned to a time slot Tx with a predetermined interval, so that the total time assigned to the whole part of the data words is $Tx \times n$.

Assuming that the time necessary for transmitting the synchronizing word SYN is Ts, the signal sending-/receiving unit 11 sends the synchronizing word SYN at every time of $(Ts+Tx \times n)$. When each of the slave stations S1 to Sn receives the synchronizing word SYN, each TIMER 43 provided in each of the signal sending-/receiving units S1b to Snb is initialized.

In the slave station Sk of which the station number k is set by the station number setting switch 35, the data transmission is performed in the period $\Delta Tk$ from the time $(k-1) \times Tx$ to the time $k \times Tx$ as the individual communication period, assigned to the station Sk after the TIMER 43, is initialized by the synchronizing word SYN.

In this embodiment, there are three kinds of synchronizing words SYN selected, whereby there can be three kinds of communication processing ways selected between the programable controller 1 and each of the slave stations S1 to Sn. One of the three kinds of synchronizing words SYN is used as a first synchronizing word for "connection preparing process" at the time of powering on the programable controller 1, so as to select a mode of a connection confirming order for confirming a kind of the slave stations S1 to Sn (input type or output type) and the operating condition of each of the slave stations (such as a condition of power on / cut off and the connection to the communication line 3). The second synchronizing word SYN is used as a data signal for "I/O refresh process" for performing an actual data transmission so as to select a mode of "I/O refresh order" for indicating the data transmission between the programable controller 1 and each of the slave stations S1 to Sn. The third synchronizing word SYN is used as a data signal for a predetermined number of times of "I/O refresh processes", so as to select a mode of a connection reconfirming order used for "connection reconfirming process" for reconfirming the condition of each of the slave stations S1 to Sn. Whenever any kind of the synchronizing word SYN is received by the slave stations S1 to Sn, the TIMER 43, included in each of the signal sending/receiving units S1b to Snb, is initialized.

Figure 6A:
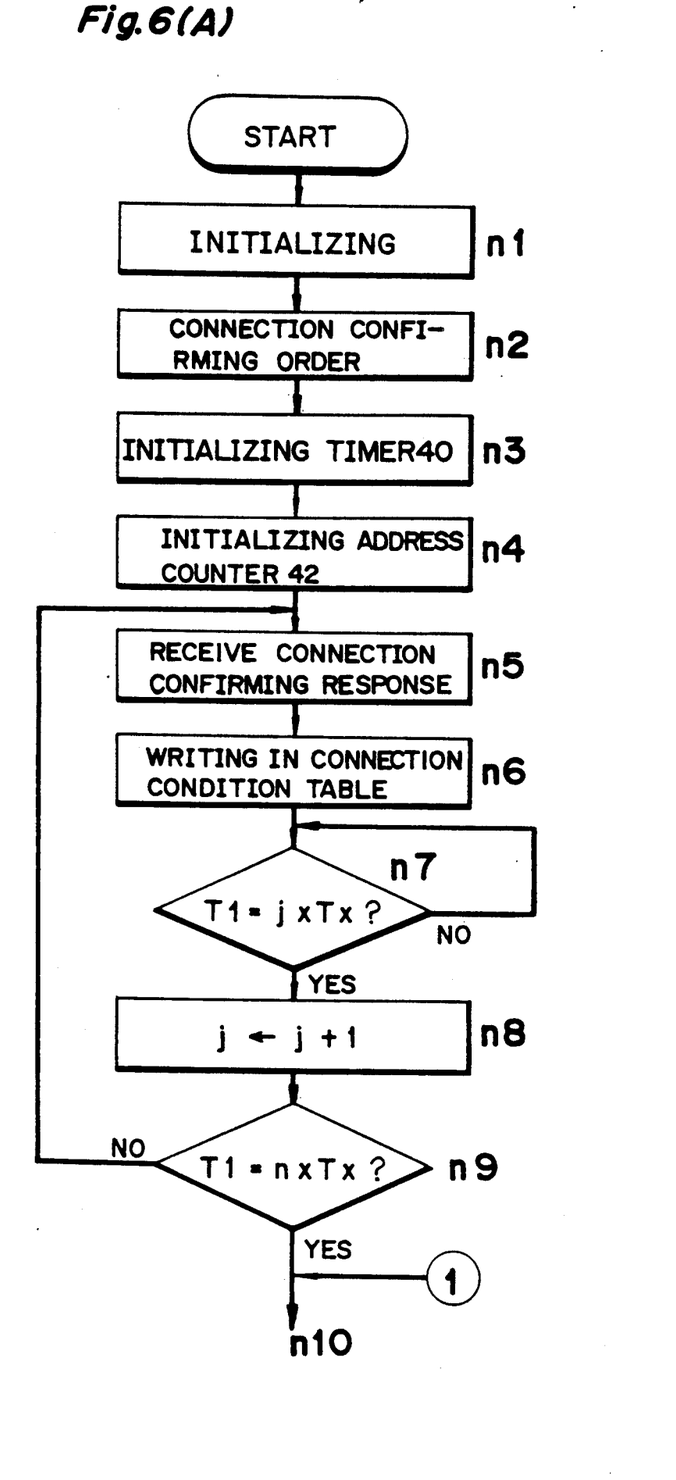
FIGS. 6A to 6C are flow charts for explaining an operation sending/receiving unit 11.
Figure 6B:
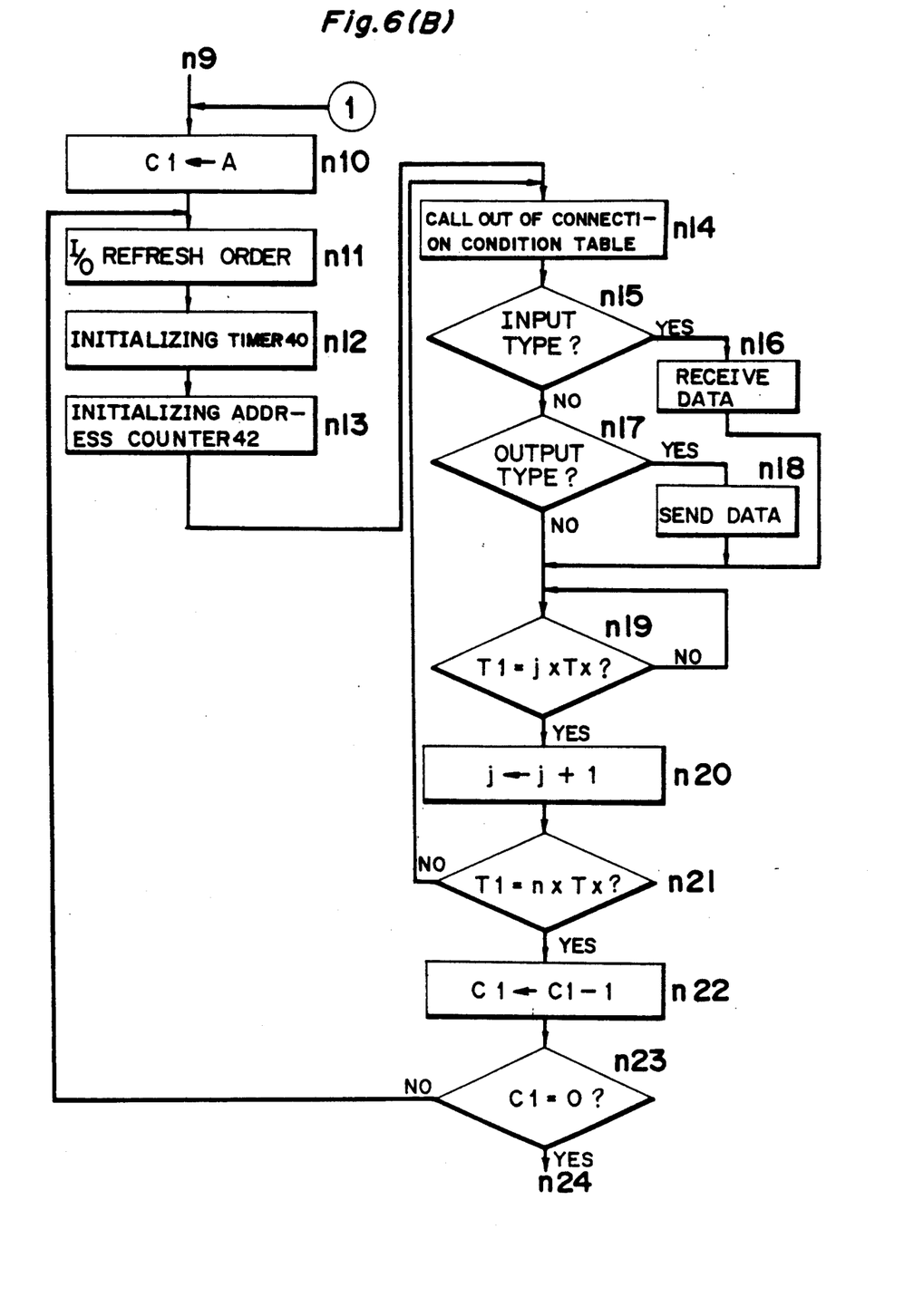
Figure 6C:
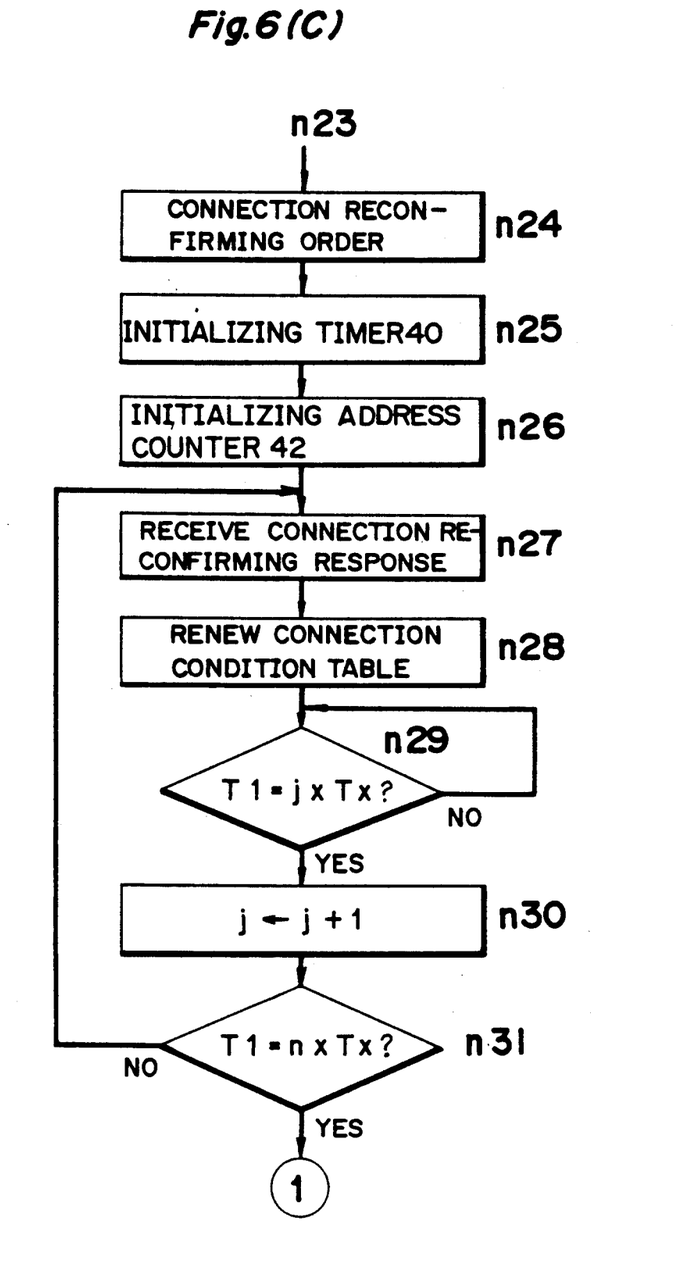

FIGS. 6A to 6C are flow charts for explaining an operation of the signal sending/receiving unit 11. When the programable controller 1 is powered on, every unit provided in the programable controller 1 is initialized in step n1. Next in step n2, a signal of connection confirming order is sent to the slave stations S1 to Sn through the communication line 3, and at the same time the TIMER 40 is initialized in step n3. Then the address counter 42 is initialized so that the count value j thereof is set 0 in step n4.

In step n5, when a connection confirming response signal is received from the slave station Sj, corresponding to the count value j which is maintained by the address counter 42, the connection condition is written in a connection condition table, to be described later in response to said connection confirming response signal in step n6.

Next in step n7, it is judged whether or not the time T1 timed by the first TIMER 40 satisfies an equation (1) as follows;

$$T1 = j \times Tx \quad (1)$$

and in the case of not satisfying the equation, the process of step n7 is repeated. In the case of satisfying the equation (1) in step n7, the program goes to step n8 and the count value j of the address counter 42 is increased by 1. Subsequently in step n9, it is judged whether or not the time T1 registered by the first TIMER 40 satisfies an equation (2) as follows;

$$T1 = n \times Tx \quad (2)$$

and in the case of not satisfying the equation (2), the program goes back to step n5. In the case of satisfying the equation (2) in step n9, the program goes to step n10. The above mentioned process from steps n1 to n9 corresponds to the "connection preparing process". Through the connection preparing process mentioned above, it is written in the connection condition table whether each of the slave stations S1 to Sn is an input type or an output type. At the same time, a slave station having no response signal and a slave station having an erroneous transmission signal in response to the connection confirming order, are detected.

In step n10, a predetermined setting value A is substituted for the count value C1 of the I/O refresh counter 41. The setting value A is set for performing the "connection reconfirming process", to be described later, at regular intervals. Thus, the change of the condition of each of the slave stations S1 to Sn can be confirmed at every A times of the "I/O refresh process".

In step n11, the I/O refresh order signal is transmitted to each of the slave stations S1 to Sn. Subsequently in step n12, the first TIMER 40 is initialized and in step n13 the address counter 42 is initialized so that the count value j thereof is set 0.

In step n14, the connection condition of the slave station Sj corresponding to the count value j of the address counter 42 is read out of the connection condition table, whereby it is judged in step n15 whether the slave station Sj is an input type or not. In the case where the slave station Sj is an input type, the program goes to step n16 and the signal sending/receiving unit 11 receives a data through the communication line 3, and subsequently the program goes to step n19. In the case where it is judged in step n15 that the slave station Sj is not an input type, the program goes to step n17 and it is judged whether or not the slave station Sj is an output type. In the case of an output type, the program goes to step n18 and the signal sending/receiving unit 11 transmits a data signal through the communication line 3 and the program goes to step n19. In the case where it is judged in step n17 that the slave station Sj is not an output type, the program goes to step n19.

In step n19, it is judged whether or not the time T1 registered by the first TIMER 40 satisfies the above mentioned equation (1) $T1=j \times Tx$, and in the case of not satisfying the equation (1), the process of step n19 is repeated, and in case of satisfying the equation (1), the program goes to step n20. In step n20, the count value j of the address counter 42 is increases by 1.

Subsequently, it is judged in step n21 whether or not the time T1 registered by the first TIMER 40 satisfies the above mentioned equation (2) T1=n×Tx, and in the case of not satisfying the equation (2), it is judged that the communication process of one frame is not yet completed and the program returns to step n14. In the case of satisfying the equation (2) in step n21, the program goes to step n22.

In step n22, the count value C1 of the I/O refresh counter 41 is decreased by 1 and subsequently in step n23 it is judged whether or not the count value C1 is 0. In the case of 'NO', it is judged that the above mentioned A times of the "I/O refresh process" is not performed so that the program returns to step n11. In the case of 'YES' in step n23, the program goes to step n24.

The above mentioned process of steps from n10 to n23 corresponds to the "I/O refresh process" and after performing the I/O refresh process A times, the program goes to the "connection reconfirming process".

In step n24, the connection reconfirming order signal is transmitted from the signal sending/receiving unit 11 to each of the slave stations S1 to Sn through the communication line 3. Generally at the same time, the first TIMER 40 is initialized in step n25 and the address counter 42 is initialized in step n26. In step n27, the signal sending/receiving unit 11 receives the connection reconfirming response signal sent from the slave station Sj corresponding to the count value j of the address counter 42, so that the data of the connection condition table corresponding to the slave station Sj is renewed in step n28.

Subsequently, the program goes to step n29 and it is judged whether or not the time T1 registered by the TIMER 40 satisfies the above mentioned equation (1) T1=j×Tx, and in the case of 'NO', the process of step n29 is repeated, and in the case of 'YES', the program goes to step n30. In step n30 the count value j of the address counter 42 is increased by 1 and the program goes to step n31. In step n31, it is judged whether or not the time T1 registered by the first TIMER 40 satisfies the above mentioned equation (2) T1=n×Tx, and in the case of not satisfying the equation (2), it is judged that the connection condition table with relation to all of the slave stations S1 to Sn has not yet renewed, and the program returns to step n27. In the case of satisfying the equation (2) in step n31, the program goes back to step n10.

The process of steps n24 to n31 corresponds to the "connection reconfirming process", which is performed at every A times of the "I/O refresh process" as described above.

Figure 7A:
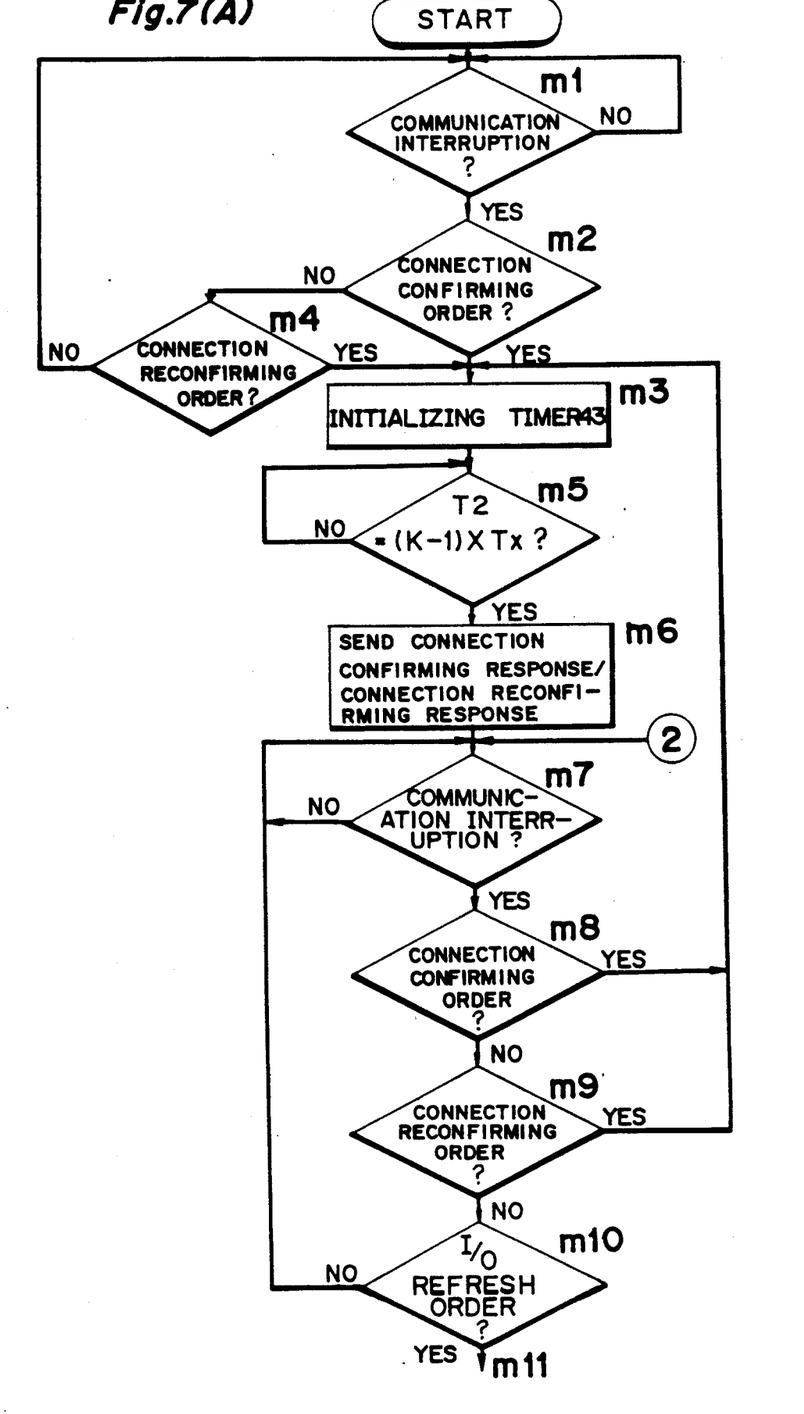
FIGS. 7A and 7B are flow charts for explaining an operation of the signal sending/receiving unit Skb.
Figure 7B:
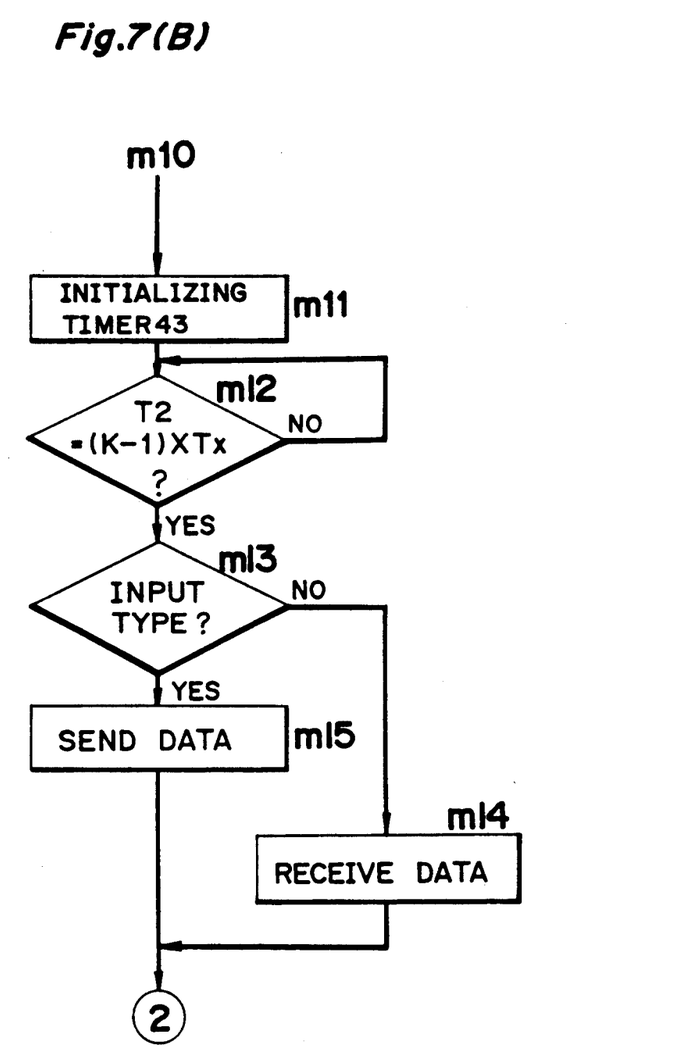

FIGS. 7A and 7B are flow charts for explaining the operation of the signal sending/receiving unit Skb provided in the slave station Sk. When the slave station S1 is powered on, it is judged in step m1 whether or not there is a communication interruption caused by the programable controller 1. In the case of 'NO', the process of step m1 is repeated, and in the case of 'YES', the program goes to step m2 and it is judged whether or not the synchronizing word SYN is data for a connection confirming order. In the case of 'YES', the program goes to step m3. In the case of 'NO', the program goes to step m4 and it is judged whether or not the synchronizing word SYN is data for a connection reconfirming order. If it is judged in step m4 that the synchronizing word SYN is not data for a connection reconfirming order, the program goes back to step m1. If it is judged in step m4 that the synchronizing word SYN is data for a connection reconfirming order, the program goes to step m3.

The second TIMER 43 is initialized in step m3 and subsequently it is judged in step m5 whether or not the time T2 registered by the second TIMER 43 satisfies an equation (3) as follows;

$$T2 = (k-1) \times Tx \qquad (3)$$

and in case of not satisfying the equation (3), the process of step m5 is repeated, and in the case of satisfying the equation (3), the program goes to step m6. In other words, the slave station Sk waits for a period of time $(k-1) \times Tx$ from the time of receipt of the synchronizing word SYN to the time of its own individual communication period.

In step m6, in the case where the synchronizing word SYN is data for a connection confirming order, a connection confirming response signal is transmitted to the signal sending/receiving unit 11 through the communication line 3. In the case where the synchronizing word SYN is data for a connection reconfirming order, a connection reconfirming response signal is transmitted to the signal sending/receiving unit 11 through the communication line 3.

After finishing the process as described above, the program goes to step m7 and the signal sending/receiving unit Skb waits for the communication interruption to be caused by the programable controller again 1 and it is judged whether or not the communication interruption occurs. In the case of the occurring of the communication interruption, the program goes to step m8 and it is judged whether or not the synchronizing word SYN is data for a connection confirming order. In the case of the connection confirming order occurring in step m8, the program goes back to step m3, and in the case of not having a connection confirming order in step m8, the program goes to step m9. It is judged in step m9 whether or not the synchronizing word SYN is data for a connection reconfirming order, and in the case of a connection reconfirming order occurring, the program goes to step m3. In the case of a connection reconfirming order not occurring in step m9, the program goes to step m10.

It is judged in step m10 whether or not the synchronizing word SYN is a data signal for I/O refresh order. In the case of an I/O refresh order not occurring in step m10, the program goes back to step m7 and the signal sending/receiving unit Skb waits for the communication interruption to be caused by the programable controller 1 again. In the case of an I/O refresh order occurring in step m10, the program goes to step m11.

The second TIMER 43, provided in the signal sending/receiving unit Skb, is initialized in step m11 and the program goes to step m12. It is judged in step m12 whether or not the time T2 registered by the second TIMER 43 satisfies the above mentioned equation (3) T2=lk−1)×Tx. In the case of not satisfying the equation (3) in step m12, the process of step m12 is repeated, and in the case of satisfying the equation (3) in step m12, the program goes to step m13.

It is judged in step m13 whether or not the slave station Sk is an input type, and in the case of it not being on input type judged, it is judged to be an output type and the program goes to step m14 and the slave station Sk receives a data signal from the programable controller 1 through the communication line 3. In the case of an input type judged in step m13, the program goes to step m15 and the slave station Sk sends a data signal to the programable controller 1 through the communication line 3. Subsequently, the program goes back to step m7.

The process of steps m1 to m6 as described above represents the "connection preparing process" and "connection reconfirming process" and the process of steps m7 to m15 represents the "I/O refresh process".

Table 1 shows an example of the connection condition table mentioned above. The connection condition refresh order signal. In the case where there is a response signal, a data "0" is assigned to the data D4, and in the case where there is no response signal, a data "1" is assigned to the data D4. The data D3 is data for judging whether or not there is an error of a transmission signal. In the case where there is an error of the transmission signal, a data "1" is assigned to the data D3, and in the case that there is no error of the transmission signal, a data "0" is assigned to the data D3.

TABLE 1

| S NO. | D7 I/O | D6 C. P./C. R. NO RESPONSE | D5 C. P./C. R. ERROR | D4 I/O REFRESH NO RESPONSE | D3 I/O REFRESH ERROR | D2 UNDEFINED | D1 UNDEFINED | D0 UNDEFINED | EXPLANATION KIND | EXPLANATION NORMAL/ABNORMAL |
|---|---|---|---|---|---|---|---|---|---|---|
| 1 | 0 | 0 | 0 | 0 | 0 | 0 | 0 | 0 | IN | NORMAL |
| 2 | 1 | 0 | 0 | 0 | 0 | 0 | 0 | 0 | OUT | NORMAL |
| 3 | 1 | 0 | 0 | 0 | 0 | 0 | 0 | 0 | OUT | NORMAL |
| 4 | 0 | 1 | 0 | 0 | 0 | 0 | 0 | 0 | X | ABNOR. |
| 5 | 0 | 0 | 0 | 1 | 0 | 0 | 0 | 0 | IN | ABNOR. |
| 6 | 0 | 0 | 1 | 0 | 0 | 0 | 0 | 0 | X | ABNOR. |
| 7 | 1 | 0 | 0 | 0 | 0 | 0 | 0 | 0 | OUT | NORMAL |
| 8 | 0 | 1 | 0 | 0 | 0 | 0 | 0 | 0 | X | ABNOR. |
| . | . | . | . | . | . | . | . | . | . | . |
| n | 0 | 1 | 0 | 0 | 0 | 0 | 0 | 0 | X | ABNOR. |

Note
1. C. P. represents CONNECTION PREPARING PROCESS.
2. C. R. represents CONNECTION RECONFIRMING PROCESS.
3. X represents UNKNOWN.
4. IN and OUT show INPUT and OUTPUT.

table is provided in the memory area of the RAM 20 in the signal sending/receiving unit 11, wherein there is assigned, for example, an area of eight bits of D0 to D7 for one slave station Sk. In the "connection preparing process", the data such as D5 to D7 are written in the connection condition table. For example, the data D7, corresponding to the uppermost bit, is a data for discriminating the slave station Sk whether it is an input type or an output type, and in the case of it being an output type slave station Sk, a data "1" for example is assigned to the data D7. In the case of it being an input type slave station Sk, a data "0" is assigned to the data D7. The data D6 is a data for judging whether or not there is a response signal from the slave station Sk. In the case where there is no response signal, a data "1" is stored for the data D6, and in the case where there is a response signal, a data "0" is stored for the data D6. The data D5 is data for judging whether or not there is an error of a transmission signal for a connection confirming response. In the case where there is an error of the transmission signal, a data "1" is assigned to the data D5, and in the case where there is no error of the transmission signal, a data "0" is assigned to the data D5.

The "connection reconfirming process" is generally similar to the "connection preparing process" and in this case the data D5 to D7 are renewed. That is to say, in the case where the condition of the slave stations S1 to Sn is changed, the data D5 to D7 are changed through the "connection reconfirming process", whereby the change of the condition of the slave stations S1 to Sn can be detected.

In the "I/O refresh process", the data D3 and D4 are written in. For example, the data D4 is data for judging whether or not there is a response signal transmitted from each of the slave stations S1 to Sn. In the case where the slave station Sk is an input type slave station for example, the above mentioned judgment can be performed by judging whether or not any data signal is received immediately after the transmission of the I/O The above mentioned process for the output type slave stations in the "I/O refresh process" is performed in a manner such that, the data transmitted from the signal sending/receiving unit 11 to the slave stations S1 to Sn, through the communication line 3, is returned back to be received by the signal sending/receiving unit 11, per se, so as to be compared with said transmitting data. In this way, an impingement can be detected between a data signal generated on the communication line 3 due to a short circuit of the communication line 3 or an abnormal accident in a slave station and a data signal transmitted from the other slave stations. In this case, a data "1" is assigned to the data D3 or D4 corresponding to the slave station which is now under communication.

As described above, the slave stations such as S4, S5, S6, S8 and Sn in which at least one data among the data D3 to D6 is "1" can be detected as a slave station with an occurrence of an abnormal accident.

Moreover, the data D0 to D2 are undefined in this embodiment.

As described above, in this embodiment, one frame of one communication unit period consists of a synchronizing word SYN and n pieces of data words W1 to Wn of which the numeral n corresponds to the number of the slave stations S1 to Sn. The slave station Sk e.g. has a period corresponding to the data word Wk in the period of one frame as an individual communication period thereof, such that the communication between the programable controller 1 and each of the slave stations S1 to Sn is performed. Moreover, the connection condition table is now capable of being written in and renewing in both of the processes, "I/O refresh process" and "connection reconfirming process", therefore, the connection condition between the signal sending/receiving unit 11 and the slave stations S1 to Sn is always monitored so that an occurrence of an abnormal accident such as a short circuit in the communication system can be detected.

Accordingly, the time between communications of the programable controller 1 and the slave stations S1 to Sn can be reduced, in this embodiment, as compared to the systems such as the polling system, CSMA-CD system and token passing system as described in the prior art. Therefore, a data signal can be transmitted at a high speed and the communication between the programable controller 1 and one of the slave stations S1 to Sn can be periodically performed. In addition, since an occurrence of an abnormal accident in the communication system can be detected in the way as described above, the reliability of the communication system can also be improved.

As described above according to the present invention, a communication system best suitable for a communication constitution can be realized, wherein a data signal can be periodically transmitted at a high speed and the amount of the data unit transmission between the main station and a comparatively large number of peripheral stations can be made at comparatively low level of capacity.

What is claimed is:

1. A data transmission and receiving communication system for communicating data between a main station and each of a plurality of peripheral stations during an identifiable period of time, said system comprising:
    a main station including a first timer device for sequentially identifying each of the plurality of peripheral stations with which said main station is communicating data;
    a plurality of peripheral stations, each including a second timer device, each being connected to said main station through a common communication line, each said second timer device for initiating data communication between said main station and each corresponding peripheral station every communication unit period, with the order of the communications between the main station and each of the peripheral stations being predetermined and a data communication between the main station and each of the peripheral stations occurring during sequential intervals of said communication unit period, each interval of equivalent time duration;
    and wherein, upon each said second timer means counting a designated period of time, determining on the basis of the predetermined communication order of each of the peripheral stations and said equivalent time duration of each interval of said communication unit period, initiating the data communication between the main station and each of the peripheral stations, and
    said main station identifying the peripheral station under communication of data by a sequential time counted by the first timer device.

2. The communication system of claim 1, wherein said communication unit period includes intervals of a synchronizing word and a plurality of data words, the number of which corresponds to the number of the peripheral stations.

3. The communication system of claim 1, wherein condition data of existance of a connection between the main station and each of the peripheral stations can be written and renewed into the main station.

4. The communication system of claim 1, wherein each of said second timer device of said peripheral stations are initialized prior data communication and each peripheral station is further identified in status as one of an input and output device.

5. The communication step of claim 4, wherein data transmission involves the main station receiving data from an input device and transmitting data to a peripheral station identified as an output device.

6. The communication system of claim 4, wherein the main station further comprises:
    connection reconfirming means for periodically confirming connection of each of said plurality of peripheral stations with said main station, for confirming the status of each of said plurality of peripheral stations as one of an input and output device, and finally for detecting any change in status.

7. The communication system of claim 6, wherein, upon determination of status and any change in status, said data communication being one of a peripheral station, designated as an input device, receiving data from said main station and a peripheral station, designated as an output device, sending data to said main station.

8. The communication system of claim 5, wherein said main station is a robotic device and said peripheral stations are various input and output peripheral devices.

9. A method of data communication between a main station and a plurality of substations, each connected to said main station by a common communication line, comprising the steps of:
    (a) preparing each of said plurality of substations for data communication with said main station by,
        (1) identifying each of said substations,
        (2) designating a predetermined time period for data communication between said main station and each of said plurality of substations, and
        (3) storing said identification and designated information at said main station;
    (b) communicating data, along said common communication line, between said main station and each of said plurality of substations by,
        (1) selecting each of said plurality of substations, in a sequential order, for data communication between said selected substation and said main station,
        (2) counting said predetermined time period of step (a)(2), by means of a first timer at said main station for data communication between said main station and each selected substation, said predetermined time period being equal for all of said plurality of substations,
        (3) initiating data communication at each of said plurality of substations upon each said substation being activated by means of a second timer located at each of said plurality of substations, each of said second timers activating each said substation after counting a time corresponding to its substation identification number minus one, multiplied by the predetermined time period of said first timer;
        (4) communicating data during said predetermined time period of said first timer,
        (5) selecting by said main station, a next sequential substation upon completion of said counting of a predetermined time by said first timer;
    (c) reconfirming a communication between said main station and each of said plurality of substations by sequentially checking that each of said plurality of substations remains connected to said main station through said common communication line.

10. A method, as claimed in claim 9, wherein said identifying step (1) of the preparation (a) includes:
   (a) designating an identification number for each of said plurality of substations, in a sequential numerical order,
   (b) identifying a status of each of said plurality of substations as one of an input and an output device,
   (c) storing said identification numbers and said identified status for each of said plurality of substations as one of an input and output device, in a tabular format at said main station.

11. A method, as claimed in claim 10, wherein said reconfirming step (c) of claim 7 includes:
   (1) reconfirming the status of each of the plurality of substations as being one of an input and an output device, and
   (2) correcting said stored tabular data for each of said plurality of substations for which there has been a change in station and storing a new status in place of the previously stored status in said tabular format.

12. A method, as claimed in claim 10, wherein said data communication step (b) dictates one of said main station receiving data from an input device and said main station sending data to an output device.

13. A method as claimed in claim 9, wherein said main station is a robotic device and said plurality of substations are peripheral devices.

14. A method, as claimed in claim 9, wherein said main station can identify which of said substations is communicating data on the basis of said time counted by said first timer at said main station.

15. A method of data communication between a main station and a plurality of substations, along a common communication line connecting the main station and each of the plurality of substations, comprising the steps of:
   (a) initializing a first timer device at said main station;
   (b) assigning a substation identification number to each of said plurality of substations;
   (c) predetermining a selected period of time for which data communication may occur between a selected substations and said main station;
   (d) initializing a second timer device at each of said substations;
   (e) communicating data between a selected substation and said main station for said predetermined selected period of time, said main station allowing for data communication with said selected substation based on a time counted by the first timer device and said selected substation simultaneously, and independent of the main station and first timer, allowing for data communication with said main station based solely upon said second timer device for said selected substation reaching a count equal to the substation identification number minus one, multiplied by said predetermined period of time;
   (f) incrementing a substation identification counting device by one at the end of said predetermined period of time as indicated by said first timer device;
   (g) repeating steps e-f a plurality of times, equal in number to said plurality of substations, such that data communication will occur between each of said plurality of substations and said main station for an equal period of time, each equal to said predetermined selected period of time, in a sequential manner.

16. A method as claimed in claim 15, wherein said main station initially identifies each of said plurality of substations as one of an input device and an output device.

17. A method, as claimed in claim 16, wherein upon data communication occurring between a selected substation and said main station, if said substation is identified as an input device then data is sent from said input device to said main station during the step (e) of communicating data and, if said substation is identified as an output device then data is sent from main station to said output device during the step (e) of communicating data.

* * * * *